United States Patent
Nyman

(10) Patent No.: US 8,312,040 B2
(45) Date of Patent: Nov. 13, 2012

(54) SYSTEM AND METHOD FOR ACCESSING POTENTIAL DAMAGE TO INFRASTRUCTURE ITEMS AFTER NATURAL EVENTS

(76) Inventor: Douglas J. Nyman, Houston, TX (US)

( * ) Notice: Subject to any disclaimer, the term of this patent is extended or adjusted under 35 U.S.C. 154(b) by 385 days.

(21) Appl. No.: 12/626,855

(22) Filed: Nov. 27, 2009

(65) Prior Publication Data

US 2011/0131230 A1    Jun. 2, 2011

(51) Int. Cl.
*G06F 17/30* (2006.01)
*G06F 7/00* (2006.01)
(52) U.S. Cl. .................. 707/769; 707/755; 707/803
(58) Field of Classification Search .............. 707/769
See application file for complete search history.

(56) References Cited

U.S. PATENT DOCUMENTS

| | | | |
|---|---|---|---|
| 6,292,108 B1 * | 9/2001 | Straser et al. | 340/870.11 |
| 6,670,889 B2 * | 12/2003 | Luan et al. | 340/690 |
| 2007/0296575 A1 * | 12/2007 | Eisold et al. | 340/539.16 |
| 2009/0112525 A1 * | 4/2009 | Adani | 702/189 |
| 2010/0320045 A1 * | 12/2010 | Muska | 188/378 |

OTHER PUBLICATIONS

Nyman, D. J., et al., "Earthquake Monitoring System for Trans-Alaska Pipeline," Proceedings of the American Society of Civil Engineers 2nd Specialty Conference of the Technical Council on Lifeline Earthquake Engineering, Oakland, California, Aug. 20-21, 1981, pp. 139-154.

Nyman, D. J., et al., "New Trans-Alaska Pipeline Earthquake Monitoring System," Proceedings of the 5th U.S. Conference on Lifeline Earthquake Engineering (Optimizing Post-Earthquake Lifeline System Reliability), Seattle, Washington, Aug. 1999, Technical Council on Lifeline Earthquake Engineering, Monograph No. 16, pp. 897-906, American Society of Civil Engineers.

USGS (U.S. Geological Survey, 2003), "Rupture in South-Central Alaska—The Denali Fault Earthquake of 2002," USGS Fact Sheet 014-03, Menlo Park, California, available at http://geopubs.wr.usgs.gov/fact-sheet/fs014-03/, (last accessed on May 11, 2010).

(Continued)

*Primary Examiner* — Kuen Lu
(74) *Attorney, Agent, or Firm* — International IP Law Group, PLLC

(57) ABSTRACT

Systems and methods for responding to a risk of damage caused by a natural event are presented. A method presented includes checking a sensor system database on a regular period for an occurrence of a natural event. If the natural event has occurred, a determination can be made as to whether the natural event is of sufficient strength and proximity to an infrastructure item to create a potential hazard to the infrastructure item. If so, a map of the severity of the natural event can be obtained from the sensor system database and compared to a database of infrastructure items. The database includes a fragility index associated with each infrastructure item. A customized checklist can then be generated for inspection of the infrastructure item.

17 Claims, 9 Drawing Sheets

OTHER PUBLICATIONS

Hall, W. J., et al., "Performance of the Trans-Alaska Pipeline in the Nov. 3, 2002 Denali Fault Earthquake," Proceedings of the Sixth U.S. Conference and Workshop on Lifeline Earthquake Engineering (Advancing Mitigation Technologies and Disaster Response), American Society of Civil Engineers Technical Council on Lifeline Earthquake Engineering, Long Beach, California, Aug. 2003.

Nyman, Douglas J., et al., "Trans-Alaska Pipeline Emergency Response and Recovery Following the Nov. 3, 2002 Denali Fault Earthquake," Proceedings of the Sixth U.S. Conference and Workshop on Lifeline Earthquake Engineering (Advancing Mitigation Technologies and Disaster Response), American Society of Civil Engineers Technical Council on Lifeline Earthquake Engineering, Long Beach, California, Aug. 2003.

Cluff, L.S., et al., "Seismic Hazard Exposure for the Trans-Alaska Pipeline," Proceedings of the Sixth U.S. Conference and Workshop on Lifeline Earthquake Engineering (Advancing Mitigation Technologies and Disaster Response), American Society of Civil Engineers Technical Council on Lifeline Earthquake Engineering, Long Beach, California, Aug. 2003.

* cited by examiner

| | | |
|---|---|---|
| Damage Level: | All<br>Green (No Damage Expected)<br>Yellow (Damage Possible)<br>Orange (Damage Likely)<br>Red (Damage Expected) | ← 404 |
| Disciplines | All<br>Communications Engineer<br>Electrical Engineer<br>Environmental Specialist<br>Geotechnical Engineer<br>Instrumentations & Controls Engineer<br>Maintenance Technician<br>Mechanical Engineer<br>Pipeline Engineer<br>Piping Engineer<br>Structural Engineer | ← 406 |
| Entity Types: | All<br>Berms/Dikes<br>Berths and Docks<br>Bottles, gas<br>Bridge, Access & Workpad, Acrow<br>Bridge, Access & Workpad, Engineered<br>Bridge, Access & Workpad, Misc Constr Era<br>Bridge, Pipeline<br>Building (std.)<br>Building, on skid<br>Cable<br>Cable Tray Systems<br>Communications Shelter<br>Conduit Systems<br>Equipment, Communications<br>Equipment, Electrical<br>Equipment, Mechanical<br>Fault Crossing<br>Geohazard, Landslide<br>Geohazard, Liquefaction<br>Geohazard, Slope, Dike or Cut<br>Pipeline, A/G Supports<br>Pipeline, Aboveground<br>Pipeline, Attachment<br>Pipeline, Below ground<br>Pipeline, Sleeve<br>Piping, Rack and Elevated Pipe supports<br>Pump, Crude Oil<br>Pump, other than Crude Oil<br>Storage Racks and Cabinets<br>Structure, Non-Building<br>Tank, Cylindrical (Vertical) Liquid<br>Tank, Horizontal<br>Tank, horizontal<br>Tank, Smal Vertical<br>Tank, Small<br>Tank, Vertical<br>Tower, Microwave (RoW)<br>Tower, Microwave (Station)<br>Unsecured Items<br>Valve, General<br>Valve, Mainline Check<br>Valve, Mainline Gate<br>Valve, relief<br>Vessel, pressure | ← 408 |

FIG. 5

Damage Level:

> All
> Green (No Damage Expected)
> Yellow (Damage Possible)
> Orange (Damage Likely)
> Red (Damage Expected)

← 404

Disciplines

> All
> Communications Engineer
> Electrical Engineer
> Environmental Specialist
> Geotechnical Engineer
> Instrumentations & Controls Engineer
> Maintenance Technician
> Mechanical Engineer
> Pipeline Engineer
> Piping Engineer
> Structural Engineer

← 406

Entity Types:

> All
> Berms/Dikes
> Berths and Docks
> Bottles, gas
> Bridge, Access & Workpad, Acrow
> Bridge, Access & Workpad, Engineered
> Bridge, Access & Workpad, Misc Constr Era
> Bridge, Pipeline
> Building (std.)
> Building, on skid
> Cable
> Cable Tray Systems
> Communications Shelter
> Conduit Systems
> Equipment, Communications
> Equipment, Electrical
> Equipment, Mechanical
> Fault Crossing
> Geohazard, Landslide
> Geohazard, Liquefaction
> Geohazard, Slope, Dike or Cut
> Pipeline, A/G Supports
> Pipeline, Aboveground
> Pipeline, Attachment
> Pipeline, Below ground
> Pipeline, Sleeve
> Piping, Rack and Elevated Pipe supports
> Pump, Crude Oil
> Pump, other than Crude Oil
> Storage Racks and Cabinets
> Structure, Non-Building
> Tank, Cylindrical (Vertical) Liquid
> Tank, Horizontal
> Tank, horizontal
> Tank, Smal Vertical
> Tank, Small
> Tank, Vertical
> Tower, Microwave (RoW)
> Tower, Microwave (Station)
> Unsecured Items
> Valve, General
> Valve, Mainline Check
> Valve, Mainline Gate
> Valve, relief
> Vessel, pressure

| MILEPOST: 23.1 - 23.4 ←808 | 804→ 2 |

Parameter Summary  Vulnerabilities

PGA - Limit: 0.2200, Actual: 0.0970, Design: 0.1500    Pipeline Integrity
PGV - Limit: 18.000, Actual: 22.993, Design: 7.0000

Responsible Disciplines:

Pipeline Engineer

Check pipeline alignment for evidence of ground settlement or horizontal movement that might load the buried pipeline. Check for evidence of leakage along or downslope of right-of-way.

Corrosion Sleeve. Structural

| MILEPOST: 23.3 ←808 | 806→ 3 |

Parameter Summary  Vulnerabilities

PGA - Limit: 0.1500, Actual: 0.0970, Design: 0.1500    Pipeline Integrity; Leakage & Spray Hazard,
PGV - Limit: 21,000, Actual: 23.030, Design: 7.0000    Primary Containment

Responsible Disciplines:

Pipeline Engineer

Check location of belowground pipeline sleeve for evidence of leakage at the ground surface or downslope, on or off right-of-way.

Corrosion Sleeve. Structural

| MILEPOST: 25.2 ←808 | 806→ 3 |

Parameter Summary  Vulnerabilities

PGA - Limit: 0.1500, Actual: 0.0970, Design: 0.1500    Pipeline Integrity; Leakage & Spray Hazard,
PGV - Limit: 21,000, Actual: 23.030, Design: 7.0000    Primary Containment

Responsible Disciplines:

Pipeline Engineer

Check location of belowground pipeline sleeve for evidence of leakage at the ground surface or downslope, on or off right-of-way.

Mainline A/G Pipeline

| MILEPOST: 23.5 - 27.2 ←808 | 802→ 1 |

Parameter Summary  Vulnerabilities

PGA - Limit: 0.1000, Actual: 0.0980, Design: 0.1500     Anchorage/Restraint or Support Integrity; Pounding
PSA03 - Limit: 0.2500, Actual: 0.0690, Design: 0.3900   Displacement, Misalignment; Structural Integrity or
PSA10 - Limit: 0.1500, Actual: 0.1720, Design: 0.2250   Enclosure/Rack Integrity

Responsible Disciplines:

Pipeline Engineer

Inspect aboveground pipeline segment for damage to cross-beams, shoes, VSMs. Check pipe for impact with VSMs. In case of loss of support, check pipe for impact with ground or disconnected hardware. Check for evidence of oil leaks or seeps through insulation, or oil on the ground.

Mainline B/G Pipeline

| MILEPOST: 27.3 - 30.4 ←808 | 804→ 2 |

Parameter Summary  Vulnerabilities
PGA - Limit: 0.2200, Actual: 0.0980, Design: 0.1500    Pipeline Integrity
PGV - Limit: 18.000, Actual: 23.920, Design: 7.0000
Responsible Disciplines:

Pipeline Engineer

Check pipeline alignment for evidence of ground settlement or horizontal movement that might load the buried pipeline. Check for evidence of leakage along or downslope of right-of-way.

| MILEPOST: 30.5 - 32.6 ←808 | 806→ 3 |

Parameter Summary  Vulnerabilities
PGA - Limit: 0.2200, Actual: 0.0990, Design: 0.1500    Pipeline Integrity
PGV - Limit: 24,000, Actual: 24.166, Design: 7.0000
Responsible Disciplines:

Pipeline Engineer

Check pipeline alignment for evidence of ground settlement or horizontal movement that might load the buried pipeline. Check for evidence of leakage along or downslope of right-of-way.

Mainline A/G Pipeline

| MILEPOST: 32.7 - 32.9 ←808 | 802→ 1 |

Parameter Summary  Vulnerabilities
PGA - Limit: 0.1000, Actual: 0.0990, Design: 0.1500    Anchorage/Restraint or Support Integrity; Pipeline
PSA03 - Limit: 0.2500, Actual: 0.0700, Design: 0.3900  Integrity; Pounding Displacement, Misalignment;
PSA10 - Limit: 0.1500, Actual: 0.1750, Design: 0.2250  Structural Integrity or Enclosure/Rack Integrity

FIG. 8B

SYSTEM AND METHOD FOR ACCESSING POTENTIAL DAMAGE TO INFRASTRUCTURE ITEMS AFTER NATURAL EVENTS

FIELD

Exemplary embodiments of the present techniques relate to the rapid assessment of the potential for damage to infrastructure systems from natural events. More specifically, the present techniques relate to automatically creating emergency response inspection checklists for infrastructure items after natural events have occurred.

BACKGROUND

This section introduces various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Infrastructure items, such as processing facilities, pipelines, pump stations, compressor stations, and the like, are often located in remote sites that make direct observation difficult. Accordingly, if a natural event, such as an earthquake, landslide, tsunami, or hurricane, among others, occurs in the vicinity of the infrastructure system, there is a need to determine the likelihood of damage and to organize and execute rapid assessment. This analysis will assist operations personnel in determining whether to shut down the infrastructure system. Various systems have been used to make this determination.

For example, an early system used remote digital strong motion accelerograph (DSMA) stations associated with specific locations of an infrastructure item, which was a pipeline in this case. The DMSA stations were comparable to commercial seismic instruments in use at that time. The remote DSMA stations had real-time computational capability and were linked to a central computer over a single telecommunications channel. Software resident on a central computer processed seismic event data to evaluate the severity of ground shaking along the pipeline route and assess the potential for damage to the pipeline and supporting facilities. Upon the occurrence of an event, an checklist of potentially damaged items associated with each location of the infrastructure was printed at the central location to guide emergency response.

Another system used a distributed network of computers at each of a number of DMSA stations located along a pipeline to perform processing of seismic events at that station. The distributed computing system allowed virtually all processing, communication, and control to be handled with software. As each DSMA station had equal processing status, i.e., there was no central computer performing the processing, each station could serve as a remote station for sensing and processing ground motion data broadcast by all other DSMA stations. Thus, each DSMA station generated checklists from the same earthquake data set, which could be retrieved by personnel at each respective location.

Another system has been developed by the U.S. Geological Survey, termed "ShakeCast." ShakeCast allows utilities, transportation agencies, businesses, and other large organizations to control and optimize the earthquake information they receive. With ShakeCast, an organization can automatically determine the shaking value at their facilities, set thresholds for notification of damage states for each facility, and then automatically notify (via pager, cell phone, or email) specified operators and inspectors within their organizations who are responsible for those particular facilities so that they can set priorities for response.

Accordingly, development activities have focused on developing new tools for alerting field personnel to hazards posed by natural events, evaluating the potential threat to the infrastructure integrity, and organizing field reconnaissance inspection. These tools will facilitate the identification of damage to the infrastructure item and the inspection of the infrastructure items for damage.

SUMMARY

An exemplary embodiment of the present techniques provides a system for automated rapid assessment and response to potential damage caused by natural events. The system includes a storage system that includes a database. The database includes a plurality of records, wherein each of the plurality of records includes an infrastructure item, a fragility index, and an inspection to be performed to determine if damage is present. The system also includes a network interface that is configured to access a sensor system database and to communicate with one or more client systems. The system includes a tangible, computer readable medium comprising code configured to direct a processor to access the sensor system database on a recurring basis to determine if an event has occurred and the associated damage potential. If an event has occurred with potential for damage, the code is configured to direct the processor to obtain a map of severity of the natural event, and correlate the map of severity with the database, generate a customized list of inspections to be performed, and provide the list to the one or more client systems.

The natural event may include an earthquake. Further, the natural event may include a landslide, liquefaction of soil, an avalanche, a hurricane, a tornado, a tsunami, or any combinations thereof. The infrastructure item may include an oil pipeline, a natural gas pipeline, a gas distribution system, an electric power distribution system, a water distribution system, or other similar distributed or site-specific systems.

The system may also include an interface to a telephone network system. The code may be configured to direct the processor to send a telephone message upon the occurrence of the natural event.

The system may also include an interface to a satellite uplink. The code may be configured to direct the processor to send a satellite message upon the occurrence of the natural event.

Another exemplary embodiment of the present techniques provides a method for assessing potential damage to infrastructure items after an occurrence of a natural event. The method includes checking a sensor system database on a regular period for an occurrence of a natural event. If the natural event has occurred, a determination may be made as to whether the natural event is of sufficient strength and proximity to an infrastructure system to create a potential hazard to the infrastructure system. If so, mapped data of the severity of the natural event can be obtained from the sensor system database. The mapped data of the severity may be compared to a database of infrastructure items comprising a fragility index associated with each infrastructure item, and an emergency action checklist may be generated for inspection of the infrastructure item.

The method may include providing a notification to personnel that a post-event inspection checklist is available. The notification may include sending an electronic mail message, a text message, a computer generated voice message, a page, a satellite message or any combinations thereof.

The method may include generating a new checklist for inspection of the infrastructure item at a different damage level. Further, the method may include generating a new checklist for inspection of the infrastructure item for a different engineering specialty. The engineering specialty may include a pipeline engineer, a structural engineer, a communications engineer, a geotechnical engineer, an environmental specialist, or any combinations thereof.

The mapped data of the severity may include a measurement of ground motion. In other embodiments, the mapped data may include wind speeds, wave heights, ice thickness, snow depth, or any combinations thereof.

The checklist may include a location for the infrastructure item. The checklist may also include a listing of structural features of the infrastructure item to be inspected.

Another exemplary embodiment of the present techniques provides a tangible, computer readable medium that stores code configured to direct a processor to access a sensor system database to identify the occurrence of a natural event and obtain a map of severity at an infrastructure item caused by the natural event. The tangible, computer readable medium may also include code to correlate the map of severity with a database of infrastructure items to obtain a listing of one or more infrastructure items that may have incurred damage at a first damage level, and generate a customized inspection plan to inspect the one or more infrastructure items for damage. The tangible, computer readable medium may also include code configured to direct the processor to generate a new action plan at a second damage level.

BRIEF DESCRIPTION OF THE DRAWINGS

Certain exemplary embodiments are described in the following detailed description and in reference to the drawings, in which:

FIG. 5 is an expanded view of the event report screen of FIG. 4 showing a more detailed view of the selections that can be made and a group of selections, in accordance with an exemplary embodiment of the present techniques;

FIG. 7 is an expanded view of the event report screen showing another group of selections, in accordance with an exemplary embodiment of the present techniques; and FIG. 8 is a page from a report generated from the selections indicated in FIG. 7, in accordance with an exemplary embodiment of the present techniques.

DETAILED DESCRIPTION OF SPECIFIC EMBODIMENTS

In the following detailed description section, the present techniques are described in connection with exemplary embodiments. However, to the extent that the following description is specific to a particular embodiment or a particular use of the present techniques, this is intended to be for exemplary purposes only and simply provides a description of the exemplary embodiments. Accordingly, the present techniques are not limited to the specific embodiments described below, but rather, such techniques include all alternatives, modifications, and equivalents falling within the true spirit and scope of the appended claims.

Exemplary embodiments of the present techniques provide systems and methods for the automatic generation of post-event inspection checklists as part of an emergency response plan (ERP) for responding to potential damage to infrastructure items created by natural events. As used herein, a natural event may include, for example, an earthquake, liquefaction of soil, a landslide, a tsunami, an avalanche, a hurricane, a tornado, an ice-storm, a snow storm, or any combinations thereof, as well as any number of other natural events. An infrastructure item may include a pipeline system, a transportation system, an electrical distribution system, a water distribution system, a refinery, a chemical plant, or an offshore platform, among others. Further, the term "infrastructure item" also includes any item that is a part of these systems, such as a pipeline segment, a pump station, a communications tower, a bridge, a substation, a tank, a flare, or an individual electrical line to a house, among any number of other items.

Figure 1:
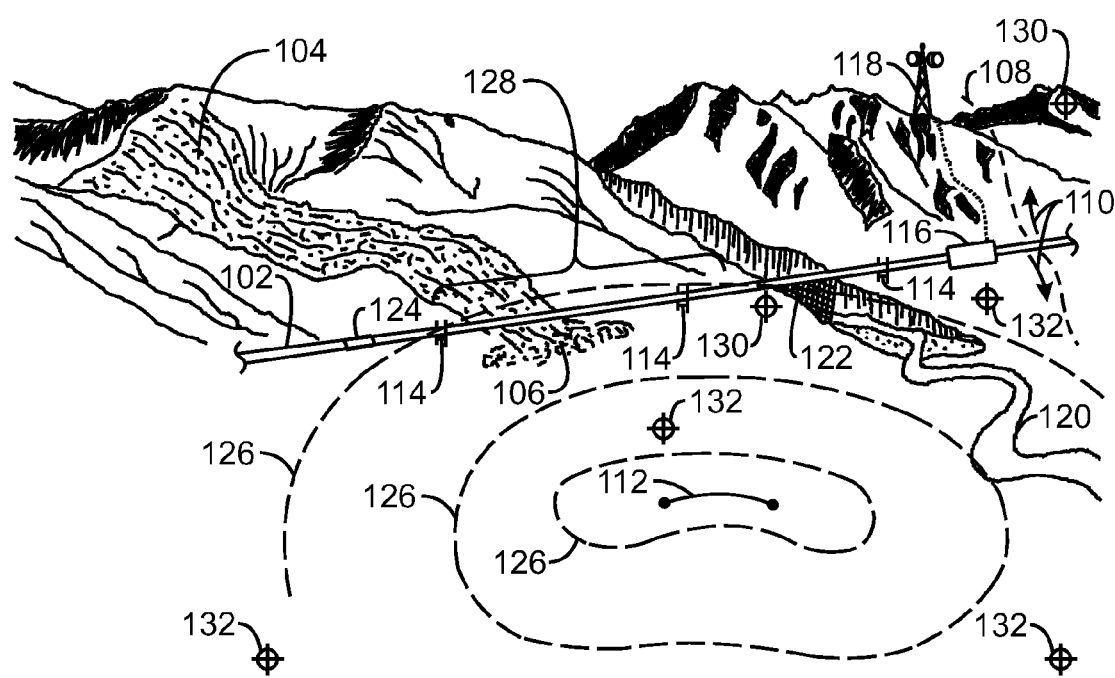
FIG. 1 is a diagram of a pipeline in a field environment, in accordance with an exemplary embodiment of the present techniques.

FIG. 1 is a diagram of a pipeline in a field environment, in accordance with an exemplary embodiment of the present techniques. The pipeline 102 can be proximate to a number of potential causes of natural events. For example, the pipeline 102 may cross near a slide zone 104, which may be considered to be an area of weakness in a slope. As used herein, the term "slide" can include a landslide or an avalanche. Although construction of the pipeline 102 will generally avoid the slide zone 104, the hazard may not have been identified before construction due to a lack of historical slide evidence 106. Further, the slide zone 104 may not have been historically active, but may instead be activated by ground motion of a sufficient magnitude in proximity to the slide zone. Further, the pipeline 102 may cross a fault 108, which could create a condition of excessive strain 110 on the pipeline 102 during a rupture of the fault 108. Other faults, such as fault 112, may not cross the pipeline 102, but may be near enough to cause substantial ground motion at the pipeline 102. As used herein, the term "substantial motion" indicates a sufficient motion to indicate a need for an inspection of the pipeline 102 and associated items for damage.

The pipeline 102 may have a number of associated infrastructure items that may be damaged by a natural event. For example, the pipeline 102 may have supports 114 that may be damaged by ground motion. Further, the pipeline 102 may have associated pumping stations, such as pumping station 116, which may be damaged or disabled by ground motion. The pumping station 116, and other sensors along the pipeline 102, may have associated communications towers, such as tower 118, which may be toppled or disabled by ground motion. At points where the pipeline 102 crosses rivers, valleys, or other natural obstacles, such as river 120, the pipeline 102 may come above ground and cross the obstacle over a bridge 122, which may be damaged or even collapsed by ground motion. Previous incidents, such as corrosion, may have necessitated repairs to the pipeline 102, for example, by the addition of a pipeline sleeve 124. The pipeline sleeve 124 may actually be stronger than the pipeline 102, but may have welds or other joints to the pipeline 102 that need to be inspected after a natural event.

Each of these infrastructure items 102, 114, 116, 118, 122, and 124 will have a number of structural features that may need to be inspected after a natural event occurs. For example, if fault 112 ruptures, ground motion waves 126 will be created. The ground motion waves 126 may affect the pipeline 102 and the associated infrastructure items 114, 116, 118, 122, and 124. Depending on the strength of the earthquake and, thus, the magnitude of the ground motion waves 126, infrastructure items nearest to the fault 112, such as the nearest section 128 of the pipeline 102, the associated pipeline supports 114, and the pipeline sleeve 124 may need detailed inspections of numerous features. Larger ruptures of the fault 112 may lead to activation of the slide zone 104, potentially resulting in a landslide that may impact the pipeline 102. Very large ruptures of the fault 112 may indicate that all of the infrastructure items 102, 114, 116, 118, 122, and 124 should be inspected for damage.

The magnitude of the ground motion 126 may be determined by a network of seismic sensors 130 and 132 that are in various locations around the pipeline 102. Some of the seismic sensors 130 may be associated with the pipeline 102, for example, placed or maintained by the pipeline company. Other seismic sensors 132 may be independent of the pipeline 102 and may be part of networks maintained by various governmental agencies, such as the USGS, among others. Each of the infrastructure items 102, 114, 116, 118, 122, and 124 may need a particular engineering specialist to inspect the structural features for damage. For example, the pipeline 102 would have welds that would be inspected by a pipeline engineer, while the bridge 122 would have supports, a base, and other structural features that would be inspected by a structural engineer. In an exemplary embodiment, a checklist of the structural features to be inspected for each infrastructure item 102, 114, 116, 118, 122, and 124 is created after a natural event occurs. The checklists can be automatically sorted by potential damage levels and engineering specialty. Personnel in each of the engineering specialties may be informed of the event and the presence of the checklists by an electronic mail, text message, page, automated voicemail, or any other suitable communications technique. The personnel may then download the checklists by signing on to an analysis system. In other embodiments, the checklists may be automatically sent by electronic mail once they become available.

Figure 2:
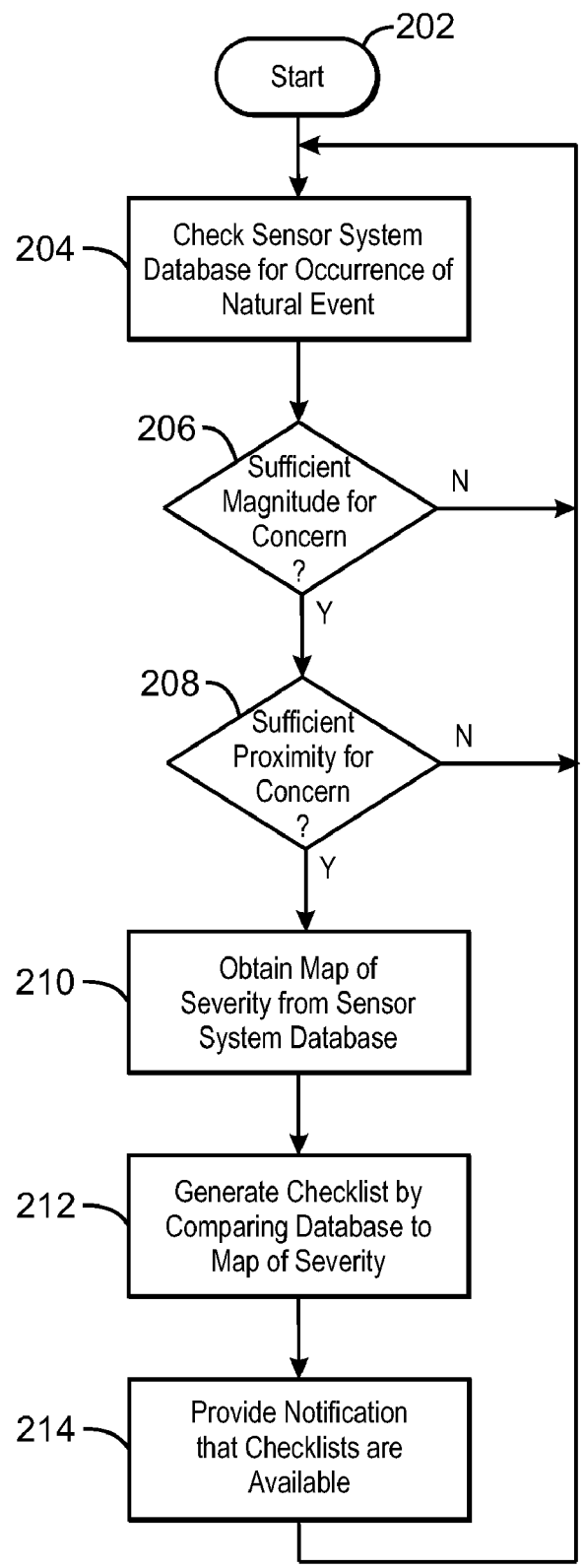
FIG. 2 is a process flow diagram of a method for generating checklists upon the occurrence of a natural event, in accordance with an exemplary embodiment of the present techniques.

FIG. 2 is a process flow diagram of a method for generating checklists upon the occurrence of a natural event, in accordance with an exemplary embodiment of the present techniques. The method described above can be performed by an analysis system that may be located in a safe place, i.e., out of the risk area of the natural event, to monitor a sensor system database for the occurrence of a natural event that may potentially cause damage to an infrastructure item (as discussed further with respect to FIG. 3). The method 200 begins at block 202.

At block 204, the analysis system can check a sensor system database for the occurrence of a natural hazard. This may be performed by regularly polling the sensor system database over a network. In an exemplary embodiment, the sensor system database is a publically accessible system run by a government agency, such as the seismic detection system operated by the U.S. Geological Survey (USGS). In other embodiments, the sensor system database may include private sensor systems associated with the infrastructure items, such as a ground motion detector system associated with a pipeline. The sensor system database is not limited to ground motion or seismic systems, as other sensor systems may be used. For example, the sensor system may include wind speed detectors and buoys operated by the National Oceanic and Atmospheric Association (NOAA) or sensor systems operated by the NOAA Tsunami Warning Centers, among others.

The polling of the sensor system database can be performed at intervals that are determined by the timeframe of the natural event. For example, if the natural event is an earthquake, the polling of the sensor system database may be performed every 30 seconds, 1 minute, 5 minutes, or longer. If the natural event is of a slower duration, such as a hurricane, the polling of the wind speeds may occur every 5 min, 10 min, 1 hour or longer. The polling is not limited to a regular interval, but may change frequency if a condition is met. For example, if no hurricane is within a range of 1000 miles, 500 miles, 200 miles, or 100 miles the polling of a sensor system database for wind speeds may only happen once per day, once per week, or even be held until a hurricane is within a designated range.

Upon detecting the occurrence of a natural event, at block 206, the analysis system can determine the strength of the natural event. If the strength is not high enough to indicate a possibility of damage to an infrastructure item, process flow returns to block 204 to continue polling the sensor system database for events. If the natural event is of sufficient magnitude to be a concern (for example, greater than about magnitude 4.5 on the moment magnitude scale for an earthquake), flow proceeds to block 208. At block 208, the proximity of the event to an infrastructure item is determined. If the natural event is too far from the infrastructure item to provide a possibility of damage, flow returns to block 204 to continue polling for events. For example, even a severe earthquake (such as a magnitude 9.0 on the moment magnitude scale) that is several hundreds of miles from the infrastructure item may pose no risk of damage to the infrastructure item.

However, if the natural event is close enough to the infrastructure item flow proceeds to block 210. At block 210, the analysis system can obtain a map database containing information indicative of the severity of the natural event. In an exemplary embodiment, the map of the severity includes a table of predicted ground motions in the vicinity of the infrastructure item which is organized by latitude and longitude. Such a table is available from the USGS as the "ShakeMap" product. In other embodiments, the map may include calculated wind speeds in the vicinity of the infrastructure item (such as caused by a hurricane), or predicted wave heights in the vicinity of the infrastructure item (such as caused by a hurricane or tsunami). In still other embodiments, the map may include ice thickness in the vicinity of an ice storm.

After obtaining the map of the severity, at block 212, the analysis system can compare the map of the severity of the natural event to a database of infrastructure items and identify a checklist for infrastructure items that may have sustained damage from the natural event. The database of infrastructure items includes a plurality of records, wherein each of the records can include an infrastructure item, one or more fragility indices, an engineering specialty, and an inspection to be performed to determine if damage is present. The checklist can be generated and prioritized by the one or more fragility indices associated with each infrastructure item. As used herein, a fragility index is a probability factor that associates a severity of the natural event with a probability that damage will be caused by a natural event of that severity. For example, a fragility index may correlate a level of ground motion with a probability of damage to a pipeline. As another example, a fragility index may correlate a wave height to a risk of damage to a support leg of an offshore platform. Thus, in an exemplary embodiment the potential damage to the infrastructure items from a natural event is categorized by a correlation of the fragility index with the severity of the event at that location, with items that have higher probability of damage indicated as needing inspection in a shorter timeframe.

The checklist provides an Emergency Response Plan (ERP) that can be used to assist in the determination of risk of damage to the infrastructure item from the natural event. In an exemplary embodiment, the checklist is sorted by engineering specialty to generate customized reports for particular specialists, as noted herein. At block 214, a notification can be provided to an engineering specialist, and other identified personnel, to inform them that a natural event has occurred, and that a report is available on the system. The notification may be an electronic mail message, a page, a text message, a voice message, or any combinations thereof. The personnel may then sign on to the system, for example, over the Internet, to obtain the report. The method described above may be implemented on any number of system configurations, such as shown in FIG. 3.

Figure 3:
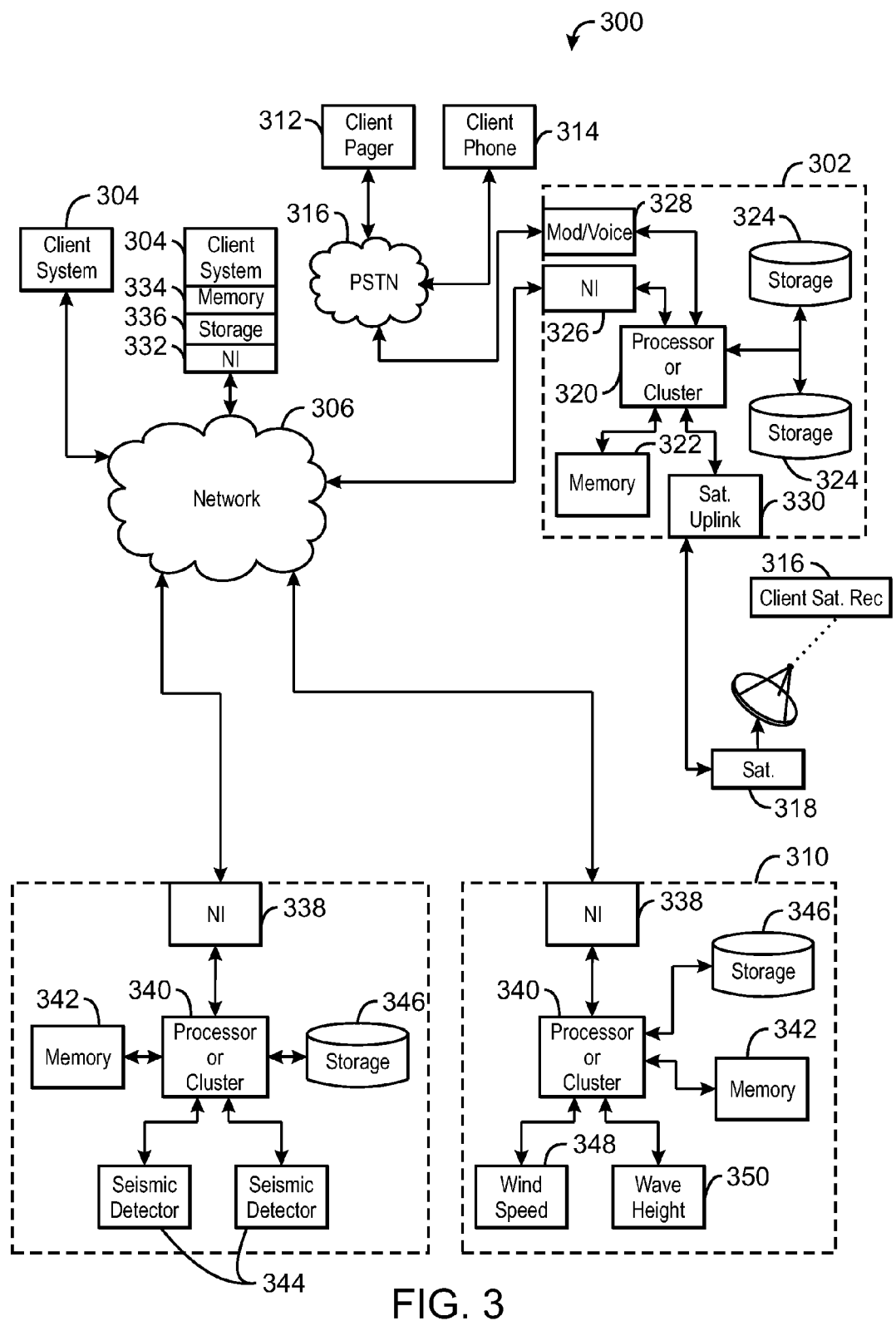
FIG. 3 is a block diagram of a system that may be used to automatically generate an automated emergency action plan, in accordance with an exemplary embodiment of the present techniques.

FIG. 3 is a block diagram of a system that may be used to automatically generate an automated emergency action plan, in accordance with an exemplary embodiment of the present techniques. The system 300 has an analysis system 302 that may communicate with client systems 304 over a network 306, for example, to send electronic mail notifications of event or to allow access to reports on the analysis system. The network may be any suitable form of computer network such as a local area network, a wide-area network (WAN), the Internet, or another network configuration. The analysis system 302 may include, for example, a server hosting a website that performs the method described herein. However, any number of systems may be used for the analysis system 302, including a dedicated computer located at a corporate office, for example, at a remote location outside of a hazard zone caused by the natural event.

The analysis system 302 may communicate with a sensor system database, such as seismic sensor system database 308, a hurricane sensor system database 310, or any number of other publically available or private systems for specific natural events (such as the National Weather Service of the United States NOAA). The analysis system 302 may also communicate with client phones, such as client pager 312 or client phone 314, over a public switched telephone network (PSTN) network 316. In case network and phone communications with personnel are interrupted, the analysis system 302 may communicate with a client satellite receiver 316, such as a satellite phone, through a satellite system 318.

The analysis system 302 may have a number of subunits to facilitate the automated generation of inspection checklists. A processor or cluster of processors 320 may be configured to execute the method 200 described with respect to FIG. 2. Further, the analysis system 302 can have a tangible, machine readable medium, such as memory 322 or storage 324 that includes instructions configured to direct the processor 320 to perform the method 200. The memory 322 may include read only memory (ROM), random access memory (RAM), or a combination thereof. The storage system 324 may include an optical drive, a hard drive, a flash drive, or any arrays or other combinations thereof. Further, the storage system 324 may include holographic drives or any other suitable storage devices that may become available in the future. The storage system 324 can be used to store a database of infrastructure items, as well as the code used to direct the processor 320 to execute the method 200.

The analysis system 302 may include a network interface 326 to facilitate communications over the network 306. A modem/voice modem 328 may facilitate communications over the PSTN, and may provide capabilities for automated voice messages, text messages, pages, or any combinations thereof. A satellite uplink 330 may be provided to facilitate communications with a satellite system 318, for example, to send voice and event alerts to the client satellite receiver 316.

Each of the client systems 304 will generally include a network interface 332 to communicate with the analysis system 302 over the network 306. Further, the client systems 304 will include tangible, computer readable media, such as memory 334 and storage 336. The memory 334 may include ROM or RAM, and the storage 336 may include a hard drive, an optical drive, a flash drive, or any combinations thereof. The tangible, computer readable media of the client systems 304 can be used, for example, to store a web browser, or other interfacing software, to access the analysis system 302.

Each of the sensor system databases 308 and 310, may have numerous subunits used to implement the functionality. For example, the seismic sensor system database 308 can use a network interface 338 to communicate with the analysis system 302 over the network 306. A processor or cluster of processors 340 will execute code in a memory 342 that is configured to direct the processors 340 to obtain seismic readings from a number of seismic detectors 344. The seismic detectors 344 do not have to be directly incorporated into the seismic sensor system database 308, but may be coupled to separate computer systems that feed the data back to the seismic sensor system database 308, for example, over the network 306 or through a public or private telecommunications systems. A storage unit 346, such as an array of hard drives, may be used to store sensor data, ground motion maps, event indications, and the like. The hurricane sensor system database 310, or other sensor systems, will include similar units and functionality, as indicated, but may poll data from different sources, such as wind speed detectors 348 and wave height detectors 350. As for the seismic sensor system database 308, the wind speed detectors 348 and wave height detectors 350 do not have to be integrated with the hurricane sensor system database 310, but may communicate with the hurricane sensor system database 310 over the network 306, or through public or private telecommunication channels.

Example

The analysis system described above was implemented for an oil pipeline to provide rapid damage assessment and inspection reports upon the occurrence of a natural event. In this implementation, the natural event was an earthquake occurring along the pipeline route. Upon receiving a notification that an earthquake has occurred, personnel can sign into the analysis system from a client system and activate a report function to display a predicted damage assessment and inspection report.

Figure 4:
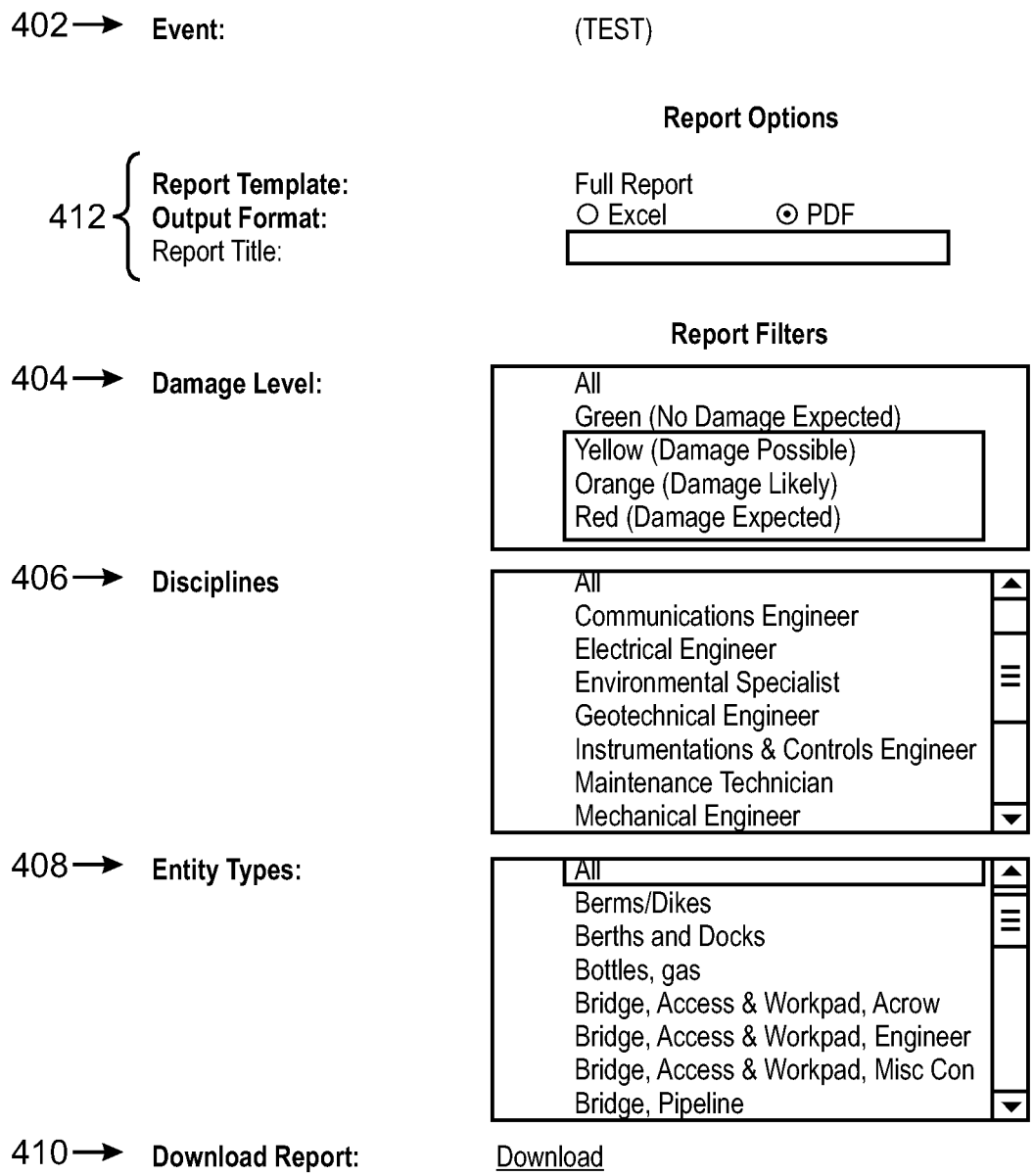
FIG. 4 is a screenshot of an event report screen, in accordance with an exemplary embodiment of the present techniques.

FIG. 4 is a screenshot of an event report screen, in accordance with an exemplary embodiment of the present techniques. For each event 402 that has occurred, the event report screen 400 allows personnel to customize a report by selecting potential damage levels 404, engineering specialties 406, and infrastructure items 408. The potential damage level 404 is indicated by color coding, with green indicating no damage expected, yellow indicating that damage is possible and an inspection should take place within about 48 hours, orange indicating that damage is likely and an inspection should occur within about 8 hours, and red indicated that damage is expected and inspection should occur as soon as possible. The system is not limited to these time frames, as other types of natural event may use other inspection periods (for example, inspection intervals after a hurricane may be measured in days and weeks). The engineering specialties 406 can be assigned to each type of infrastructure item, and may overlap if practical. Other disciplines may also be added to the core configuration if useful, such as pipeline managers, public officials, regulatory oversight groups, contracting or legal personnel. The infrastructure items 408 may include as many of the parts and subparts as is useful. Further, the infrastructure items 408 shown for this example are specific to a pipeline. In other embodiments, the infrastructure items 408 will be specific to the system being analyzed. For example, an electrical distribution system may list infrastructure items 408 such as power plants, transformers, main distribution lines, distribution towers, substations, substations, regional distribution lines, area transformers, and individual lines to businesses and residences.

After specifying the choices, personnel can save the report for future use, so that an engineer in a specific specialty can design a report that covers the items for which he or she is responsible. The engineer can then immediately download 410 the specialized report after an earthquake has occurred. In an exemplary embodiment, the customized reports could be selected after signing in to the system. In other embodiments, personnel could receive an automatically generated electronic mail containing the report. The system provides other options for receiving the report to make analysis easier. For example, personnel may choose to receive the report as a .pdf document or as a spreadsheet, as indicated by reference number 412.

FIG. 5 is an expanded view of the event report screen showing a more detailed view of the selections that can be made and a group of selections, in accordance with an exemplary embodiment of the present techniques. In FIG. 5, the damage levels 406 selected are orange and red. The engineering specialty 408 selected is a structural engineer, and the infrastructure item 410 selected is a pipeline bridge (for example, bridge 122 discussed with respect to FIG. 1). When the report is downloaded for this event, any pipeline bridges that may have sustained damage will be displayed.

Figure 6:
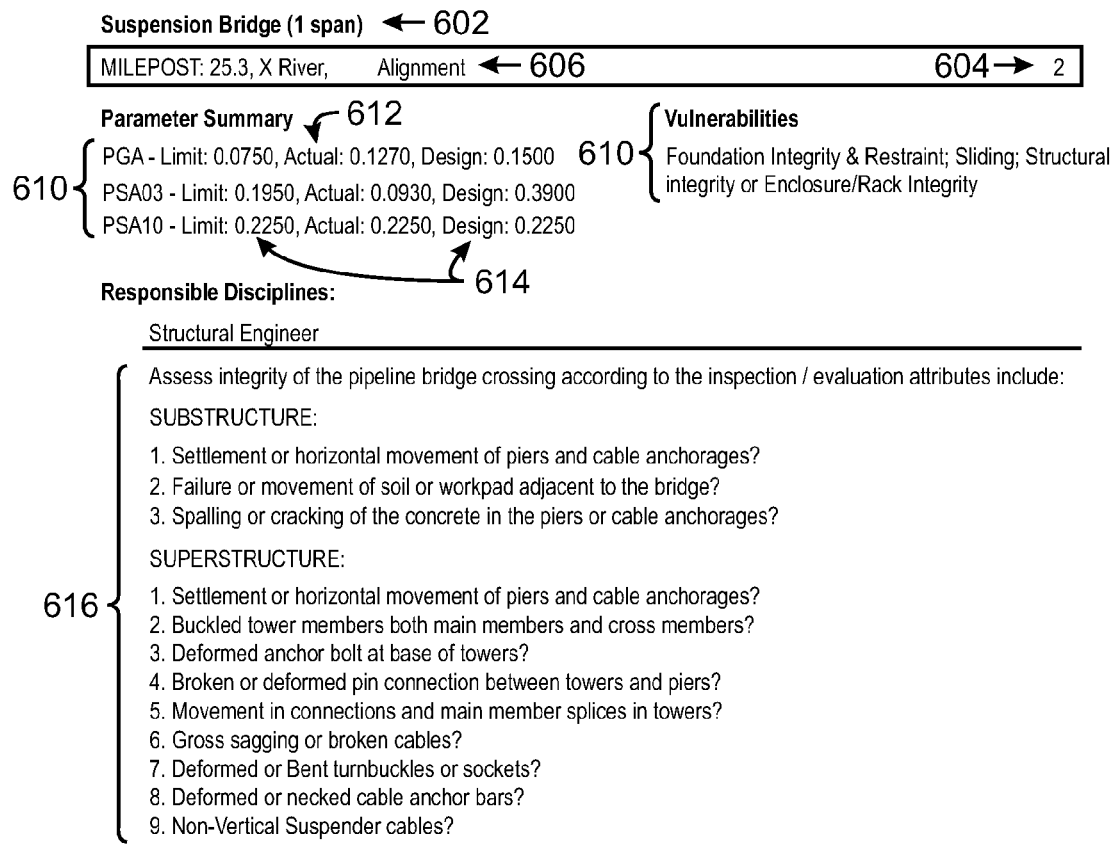
FIG. 6 is a report generated from the parameters of FIG. 5, in accordance with an exemplary embodiment of the present techniques.

FIG. 6 is a report generated from the test event using the parameters of FIG. 5, in accordance with an exemplary embodiment of the present techniques. The report 600 indicates that a suspension bridge 602 may have sustained damage in the event. The damage level 604 is orange (2) indicating that damage is possible and an inspection should be conducted within eight hours. The report 600 also indicates the specific location 606 of the bridge along the pipeline, and the name of the natural feature being crossed by the bridge (the X river in this case). The vulnerabilities 608 of the suspension bridge 608 are presented, along with a series of design parameters 610 (for example, based on peak ground acceleration (PGA) among others) that indicate an actual motion 612 that took place in comparison to one or more fragility indices 614. A checklist 616 is presented of structural features associated with the infrastructure item that should be inspected.

FIG. 7 is an expanded view of the event report screen showing another group of selections, in accordance with an exemplary embodiment of the present techniques. As indicated in FIG. 7, the damage levels 406 selected are yellow, orange, and red. The engineering specialty 408 selected is pipeline engineer, and all infrastructure items that concern the pipeline are selected, including, for example, pipeline bridges, supports, aboveground (A/G) pipeline segments (such as pipeline segments that come above ground to cross natural features), attachments, below ground (B/G) pipeline segments (such as standard pipeline segments), and sleeves. These selections generated a report of about 80 pages of infrastructure items to be inspected, an excerpt of which is presented in FIG. 8.

FIG. 8 is a page from a report generated from the selections indicated in FIG. 7, in accordance with an exemplary embodiment of the present techniques. This page is merely an example of output that may be created. As shown in FIG. 7, numerous inspection points are identified in this report, at various potential damage levels, including items at yellow 802, orange 804, and red 806.

The present techniques allow reports to be rerun selecting different damage levels 406. For a large event, this allows the removal of infrastructure items whose inspection may be postponed, allowing personnel to focus on only the most critical items. The presentation of precise locations 808 allows personnel who are less familiar with the pipeline to move to the potential damage points for inspection. This would allow engineering personnel that are brought from other locations to assist with the inspection to quickly find the correct inspection points. For smaller events, more damage levels 406 may be selected, allowing a more efficient inspection plan to be implemented.

While the present techniques may be susceptible to various modifications and alternative forms, the exemplary embodiments discussed above have been shown only by way of example. However, it should again be understood that the present techniques are not intended to be limited to the particular embodiments disclosed herein. Indeed, the present techniques include all alternatives, modifications, and equivalents falling within the true spirit and scope of the appended claims.

What is claimed is:

1. A system for automated rapid assessment and response to potential damage caused by natural events, comprising:
    a storage system, wherein the storage system comprises a database comprising a plurality of records, wherein each of the plurality of records comprises an infrastructure item, a fragility index for the infrastructure item, and an inspection to be performed to determine if damage is present, wherein the infrastructure item comprises a pipeline system, a transportation system, an electrical distribution system, a water distribution system, an industrial facility, a refinery, a chemical plant, an offshore platform, a pipeline segment, a pump station, a communications tower, a bridge, a substation, a tank, a flare, an item that is a part of these systems, or any combinations thereof;
    a network interface configured to access a sensor system database and to communicate with one or more client systems;
    a tangible, computer readable medium comprising code configured to direct a processor to:
    access the sensor system database on a recurring basis;
    determine if a natural event has occurred with a potential for causing damage, wherein the natural event comprises an earthquake, liquefaction of soil, a landslide, a tsunami, an avalanche, a hurricane, a tornado, an icestorm, a snow storm, or any combinations thereof; and, if so:
    obtain a map of severity of the natural event;
    correlate the map of severity with the database;
    generate a customized list of inspections to be performed; and
    provide the list to the one or more client systems.

2. The system of claim 1, comprising an interface to a telephone network system.

3. The system of claim 2, wherein the code is configured to direct the processor to send a telephone message upon the occurrence of the natural event.

4. The system of claim 1, comprising an interface to a satellite uplink.

5. The system of claim 4, wherein the code is configured to direct the processor to send a satellite message upon the occurrence of the natural event.

6. A method for assessing potential damage to infrastructure items after an occurrence of a natural event, comprising an automated system for:
- checking a sensor system database on a regular period for an occurrence of a natural event;

and, if the natural event has occurred,
- determining if the natural event is of sufficient strength and proximity to an infrastructure item to create a potential hazard to the infrastructure item, wherein the natural event comprises an earthquake, liquefaction of soil, a landslide, a tsunami, an avalanche, a hurricane, a tornado, an ice-storm, a snow storm, or any combinations thereof; and, if so:
- obtaining mapped data of the severity of the natural event from the sensor system database;
- comparing the mapped data of the severity to a database of infrastructure items comprising a fragility index associated with each infrastructure item, wherein the infrastructure item comprises a pipeline system, a transportation system, an electrical distribution system, a water distribution system, an industrial facility, a refinery, a chemical plant, an offshore platform, a pipeline segment, a pump station, a communications tower, a bridge, a substation, a tank, a flare, an item that is a part of these systems, or any combinations thereof; and
- generating a checklist for inspection of the infrastructure item.

7. The method of claim 6, comprising providing a notification to personnel that the checklist is available.

8. The method of claim 7, comprising sending an electronic mail message, a text message, a computer generated voice message, a page, a satellite message or any combinations thereof.

9. The method of claim 6, comprising:
- generating a new checklist for inspection of the infrastructure item at a different damage level.

10. The method of claim 6, comprising:
- generating a new checklist for inspection of the infrastructure item for a different engineering specialty.

11. The method of claim 10, wherein the engineering specialty comprises a pipeline engineer, a structural engineer, a communications engineer, a geotechnical engineer, an environmental specialist, or any combinations thereof.

12. The method of claim 6, wherein the mapped data of the severity comprises a measurement of ground motion.

13. The method of claim 6, wherein the mapped data of the severity comprises wind speeds, wave heights, ice thickness, snow depth, or any combinations thereof.

14. The method of claim 6, wherein the checklist comprises a location for the infrastructure item.

15. The method of claim 6, wherein the checklist comprises a listing of features of the infrastructure item to be inspected.

16. A tangible, computer readable medium comprising code configured to direct a processor to:
- access a sensor system database to identify the occurrence of a natural event, wherein the natural event comprises an earthquake, liquefaction of soil, a landslide, a tsunami, an avalanche, a hurricane, a tornado, an ice-storm, a snow storm, or any combinations thereof;
- obtain a map of severity of the natural event at an infrastructure item, wherein the infrastructure item comprises a pipeline system, a transportation system, an electrical distribution system, a water distribution system, an industrial facility, a refinery, a chemical plant, an offshore platform, a pipeline segment, a pump station, a communications tower, a bridge, a substation, a tank, a flare, an item that is a part of these systems, or any combinations thereof;
- correlate the map of severity with a database of infrastructure items to obtain a listing of one or more infrastructure items that may be at risk of damage at a first damage level; and
- generate a customized inspection plan to inspect the one or more infrastructure items for damage.

17. The tangible, computer readable medium of claim 16, comprising code configured to direct the processor to:
- generate a new inspection plan at a second damage level.

* * * * *